United States Patent
Yang et al.

(10) Patent No.: US 9,991,969 B2
(45) Date of Patent: Jun. 5, 2018

(54) TUNABLE RECEIVER INCLUDING MICROELECTROMECHANICAL (MEMS) MIRRORS, A TRANSCEIVER OR MODULE COMPRISING THE SAME, AND METHODS OF MAKING AND USING THE SAME

(71) Applicants: Jian Yang, Chengdu (CN); Chao Tian, Chengdu (CN); Sheng Z. Zhang, Chengdu (CN); Mark Heimbuch, Chengdu (CN)

(72) Inventors: Jian Yang, Chengdu (CN); Chao Tian, Chengdu (CN); Sheng Z. Zhang, Chengdu (CN); Mark Heimbuch, Chengdu (CN)

(73) Assignee: Source Photonics (Chengdu) Co., Ltd., Chengdu (CN)

( * ) Notice: Subject to any disclaimer, the term of this patent is extended or adjusted under 35 U.S.C. 154(b) by 260 days.

(21) Appl. No.: 15/025,878

(22) PCT Filed: Mar. 23, 2016

(86) PCT No.: PCT/CN2016/077097
§ 371 (c)(1),
(2) Date: Mar. 29, 2016

(87) PCT Pub. No.: WO2017/161519
PCT Pub. Date: Sep. 28, 2017

(65) Prior Publication Data
US 2018/0091229 A1  Mar. 29, 2018

(51) Int. Cl.
*H04B 10/00* (2013.01)
*H04B 10/69* (2013.01)
(Continued)

(52) U.S. Cl.
CPC ......... *H04B 10/691* (2013.01); *G02B 6/4206* (2013.01); *G02B 6/4246* (2013.01); *G02B 26/0833* (2013.01); *G02B 27/1006* (2013.01)

(58) Field of Classification Search
CPC ........ H04B 10/60; H04B 10/66; H04B 10/67; H04B 10/671; H04B 10/675; G01J 3/26
See application file for complete search history.

(56) References Cited

U.S. PATENT DOCUMENTS

| | | | |
|---|---|---|---|
| 2003/0151818 A1* | 8/2003 | Wagner | G02B 6/4204 359/578 |
| 2009/0041463 A1 | 2/2009 | Zhong et al. | |
| 2012/0257279 A1 | 10/2012 | Hsieh | |
| 2013/0050697 A1* | 2/2013 | Colbourne | G02B 27/4244 356/328 |

(Continued)

FOREIGN PATENT DOCUMENTS

| CN | 102033312 A | 4/2011 |
|---|---|---|
| CN | 102495466 A | 6/2012 |

(Continued)

OTHER PUBLICATIONS

Eytan Modiano et al.; "Using Tunable Optical Transceivers for Reducing the Number of Ports in WDM/TDM Networks"; 2003; 3 pgs.; Optical Society of America.

(Continued)

*Primary Examiner* — Daniel Dobson
(74) *Attorney, Agent, or Firm* — Andrew D. Fortney; Central California IP Group, P.C.

(57) ABSTRACT

An optical or optoelectronic receiver and module, and methods of making and using the same, are disclosed. The receiver includes a photodetector, a first microelectromechanical device configured to reflect a multi-wavelength optical signal, a thin film filter configured to receive the multi-wavelength optical signal reflected by the first microelectromechanical device and separate a single-wavelength optical signal from the multi-wavelength optical signal, a first lens configured to focus the single-wavelength optical signal on the photodetector, and a second microelectrome- (Continued)

chanical device configured to reflect the single-wavelength optical signal towards the first lens. Each wavelength of the multi-wavelength optical signal represents or corresponds to a unique channel over which the receiver receives optical signals. The present receiver and methods enable low-cost, high-volume manufacturing of multi-channel optical or optoelectronic receivers.

20 Claims, 4 Drawing Sheets

(51) Int. Cl.
| | | |
|---|---|---|
| *G02B 6/42* | (2006.01) | |
| *G02B 26/08* | (2006.01) | |
| *G02B 27/10* | (2006.01) | |
| *H04J 14/00* | (2006.01) | |

(56) References Cited

U.S. PATENT DOCUMENTS

2014/0022549 A1\* 1/2014 Ozeki ..................... G01J 3/26
  356/416

FOREIGN PATENT DOCUMENTS

| CN | 103293698 A | 9/2013 |
| CN | 103684616 A | 3/2014 |

OTHER PUBLICATIONS

International Search Report and Written Opinion; International Searching Authority/CN dated Oct. 20, 2016; International Application No. PCT/CN2016/077097; 8 pgs.; International Searching Authority/State Intellectual Property Office of the P.R. China; Beijing, China.

\* cited by examiner

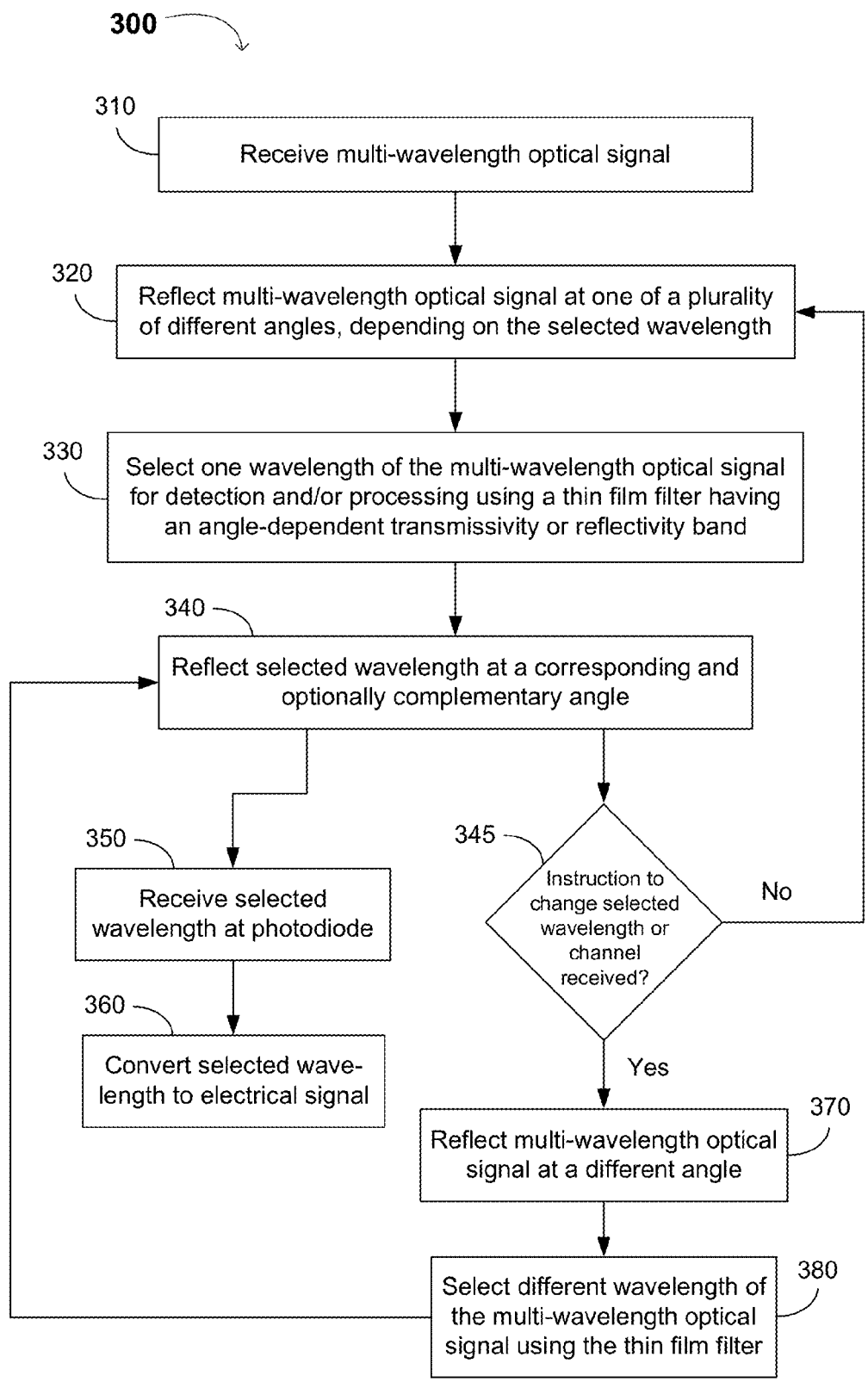

TUNABLE RECEIVER INCLUDING MICROELECTROMECHANICAL (MEMS) MIRRORS, A TRANSCEIVER OR MODULE COMPRISING THE SAME, AND METHODS OF MAKING AND USING THE SAME

FIELD OF THE INVENTION

The present invention relates to the field of optical communication, especially to an optical or optoelectronic receiver, an optical or optoelectronic transceiver or module including the same, an optical network unit (ONU) or optical line terminal (OLT) comprising the same, and methods of making and using the same.

DISCUSSION OF THE BACKGROUND

In optical communications, optical signals carry information. One objective of optical communication research and development is to increase and/or maximize bandwidth (e.g., the amount of information transmitted) to the greatest extent possible. A receiver (e.g., a photodiode) in an optical receiver or transceiver subassembly such as a ROSA or BOSA converts one or more optical signals into electrical signals.

Tunable optical receivers enable transmission and reception of multiple optical signals using the same hardware (see e.g., Modiano et al., "Using tunable optical transceivers for reducing the number of ports in WDM/TDM networks," IEEE/OSA Optical Fiber Conference [OFC], Los Angeles, Calif., February, 2004; also available at http://www.mit.edu/~modiano/papers/C74.pdf). At present, however, tunable optical receivers generally include relatively complex structures and can be relatively expensive to produce.

Microelectromechanical system (MEMS) devices are well known, and many applications are known for such devices, including for optical switching technology (e.g., from one optical fiber to another optical fiber). Such devices can function as optical mirrors, and can change the angle of reflection along one dimension or two dimensions. However, to the best of Applicant's knowledge, such MEMS mirrors have not been used in an optical receiver.

This "Discussion of the Background" section is provided for background information only. The statements in this "Discussion of the Background" are not an admission that the subject matter disclosed in this "Discussion of the Background" section constitutes prior art to the present disclosure, and no part of this "Discussion of the Background" section may be used as an admission that any part of this application, including this "Discussion of the Background" section, constitutes prior art to the present disclosure.

SUMMARY OF THE INVENTION

The present invention is intended to overcome one or more deficiencies in the prior art, and provide a tunable optical or optoelectronic receiver, comprising a photodetector, a first microelectromechanical device configured to reflect a received multi-wavelength optical signal, a thin film filter configured to receive the multi-wavelength optical signal reflected by the first microelectromechanical device and separate a single-wavelength optical signal (e.g., light having one of the multiple wavelengths) from the multi-wavelength optical signal, a first lens configured to focus the single-wavelength optical signal on the photodetector, and a second microelectromechanical device configured to reflect the single-wavelength optical signal towards the first lens. The multi-wavelength optical signal comprises light having a plurality of distinct or unique wavelengths or wavelength bands (e.g., more than one distinct $\lambda_{max}$), each distinct or unique wavelength or wavelength band representing or corresponding to a channel over which optical information (e.g., signals) is/are received by the optical or optoelectronic receiver.

In general, the first microelectromechanical device has a unique angle of reflection with respect to the multi-wavelength optical signal for each wavelength of the multi-wavelength optical signal. The second microelectromechanical device may also have an angle of reflection with respect to the single-wavelength optical signal that is synchronized with the reflection angle of the first microelectromechanical device, and thus, that may be unique for each wavelength of the multi-wavelength optical signal. The thin film filter can therefore effectively select the wavelength of the multi-wavelength optical signal to be separated in accordance with the reflection angle of the first microelectromechanical device.

In one embodiment, the multi-wavelength optical signal has four wavelengths, although it may have more than four wavelengths or less than four wavelengths. In various embodiments, each of the wavelengths in the multi-wavelength optical signal differs from the other wavelength(s) (e.g., in an adjacent channel) by at least 0.4 nm. In some embodiments consistent with use of the present receiver in an optical wavelength division multiplexing (OWDM) system, the present receiver further comprises a controller configured to change the angle of said first microelectromechanical device.

In general, the received optical signal is collimated, and may be polarized or unpolarized. The thin film filter is generally at a fixed angle relative to the initial multi-wavelength optical signal reflected by the first microelectromechanical device. For example, the thin film filter is at an initial angle relative to the reflected multi-wavelength optical signal of from 8° to 30°.

In one example, the thin film filter is a bandpass filter. In another example, the thin film filter is a notched filter. Alternatively, the thin film filter may comprise an optical grating (e.g., a diffraction grating, a Bragg grating, etc.).

A further aspect of the present invention relates to an optical module, comprising the present receiver, an optical or optoelectronic transmitter, a fiber adapter or connector configured to receive an optical fiber, and a package or housing including the receiver and the transmitter. The optical fiber carries the multi-wavelength optical signal to the optical module and receives an optical transmission signal from the transmitter. In general, the transmission signal is a single-wavelength optical signal. In certain embodiments, the optical module further comprises a beam splitter and a second lens, each inside the package or housing. In one case, the beam splitter is reflective to the multi-wavelength optical signal and transparent to the transmission signal. Alternatively, the beam splitter is transparent to the optical signal and reflective to the transmission signal. In general, the second lens collimates the multi-wavelength optical signal and, optionally, the transmission signal.

Another aspect of the present invention relates to a method of receiving and processing a multi-wavelength optical signal, comprising reflecting the multi-wavelength optical signal using a first microelectromechanical device towards a thin film filter, separating a single-wavelength optical signal from the multi-wavelength optical signal using the thin film filter, reflecting the single-wavelength optical signal towards a lens using a second microelectromechanical device, and focusing the single-wavelength optical signal on a photodetector using the lens. Each wavelength of the multi-wavelength optical signal represents or corresponds to a unique channel over which optical information is received by the optical or optoelectronic receiver, as described above.

In general, the first microelectromechanical device has a unique reflection angle with respect to the received multi-wavelength optical signal for each of the wavelengths. The second microelectromechanical device may also have a reflection angle with respect to the single-wavelength optical signal that is synchronized with the reflection angle of the first microelectromechanical device, and thus, that is unique for each wavelength of the multi-wavelength optical signal. In some embodiments (for example, when used in an OWDM method), the method further comprises changing an angle of the first microelectromechanical device with respect to the multi-wavelength optical signal (e.g., in response to an instruction from a host or other device in the network).

Yet another aspect of the present invention relates to a method of making a multi-wavelength optical or optoelectronic receiver, comprising placing first and second microelectromechanical devices, a thin film filter, a first lens and a photodetector in a package or housing such that the first microelectromechanical device receives and reflects a multi-wavelength optical signal towards the thin film filter, the thin film filter separates a single-wavelength optical signal from the multi-channel optical signal, the second microelectromechanical device reflects the single-wavelength optical signal towards the first lens, and the first lens focuses the single-wavelength optical signal on the photodetector; testing the multi-wavelength optical or optoelectronic receiver to ensure operability and/or maximize a received signal strength of the single-wavelength optical signal; and securing the first and second microelectromechanical devices, the thin film filter, the first lens and the photodetector. As for other aspects of the invention, each wavelength of the multi-wavelength optical signal represents or corresponds to a unique channel over which optical information is received by the optical or optoelectronic receiver.

In the method of making, the first and second microelectromechanical devices, the thin film filter, the first lens and the photodetector may be placed in predetermined positions and/or locations in the package or housing (or in an optical cavity within the package or housing), and when the received signal strength of the separated single-wavelength optical signal is below a predetermined threshold or is not at a maximum value, the positions and/or locations of one or more of the first and second microelectromechanical devices, the thin film filter, the first lens and/or the photodetector may be adjusted after testing. The first and second microelectromechanical devices, the thin film filter, the first lens and the photodetector may be secured in place when the received signal strength of the separated single-wavelength optical signal s equal to or above the predetermined threshold or is at the maximum value.

The present receiver, transceiver and methods can provide a tunable receiver for use in next generation passive optical network ONUs and OLTs. For example, the angle of incidence (AOI) of the multi-wavelength optical signal to the thin film filter can be changed by tuning (e.g., changing the reflection angle of) the first MEMS mirror. Changing the AOI of the beam relative to the thin film filter tunes the center wavelength of the optical signal that passes through the thin film filter (i.e., the bandpass filter wavelength, which may also change as a function of the AOI of the optical signal). The second MEMS mirror is tuned in synchronization with the first MEMS mirror so that the reflected optical beam is focused onto the same location (e.g., the photodetector) regardless of the reflection angle of the first MEMS mirror. Relative to the prior art, the present receiver, transceiver and methods offers numerous advantages, including a small size, fast tuning speed, low cost, and mature component technology, enabling mass production. These and other advantages of the present invention will become readily apparent from the detailed description of various embodiments below.

BRIEF DESCRIPTION OF THE DRAWINGS

FIG. 5 is a flow chart showing an exemplary method of using a tunable multi-wavelength receiver in accordance with one or more embodiments of the present invention.

DETAILED DESCRIPTION

Figure 1:
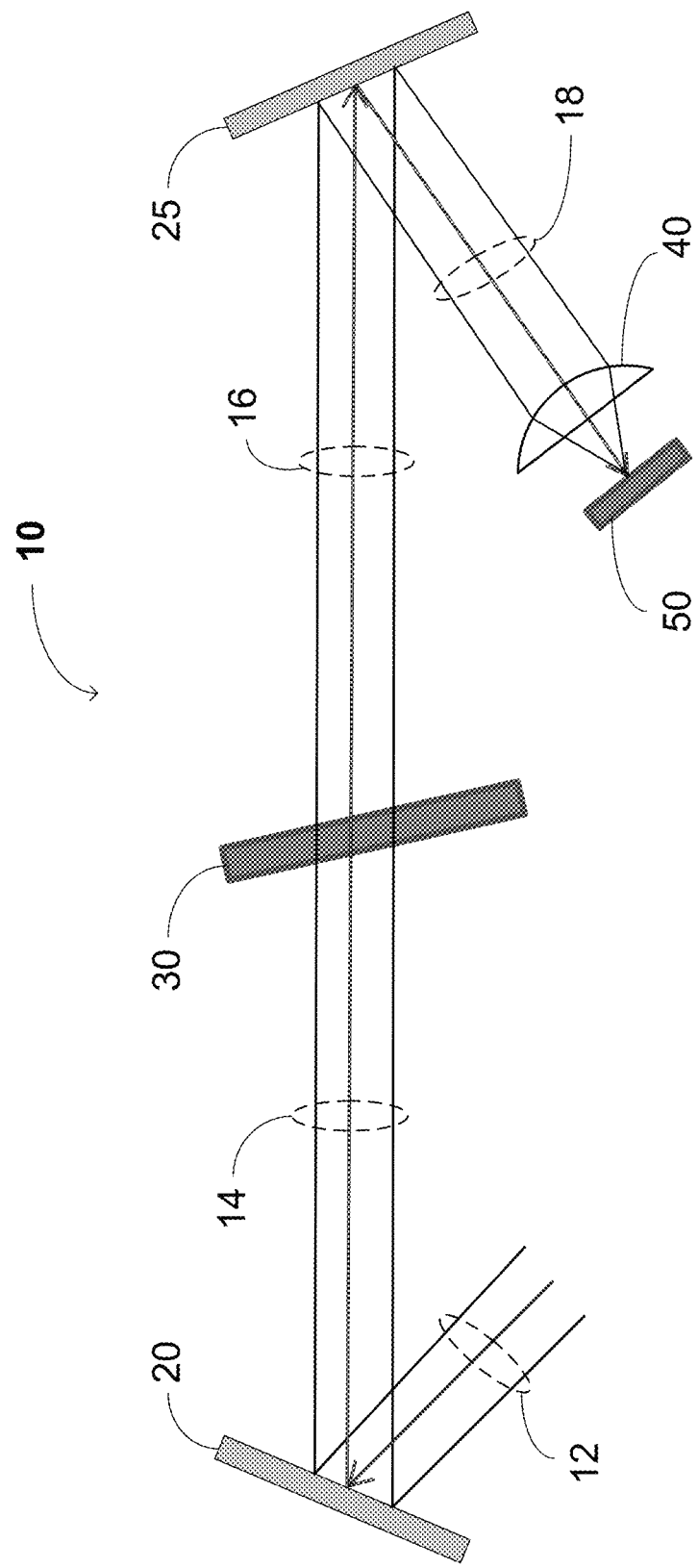
FIG. 1 is a block diagram showing an exemplary tunable multi-wavelength receiver in accordance with one or more embodiments of the present invention.

Reference will now be made in detail to various embodiments of the invention, examples of which are illustrated in the accompanying drawings. While the invention will be described in conjunction with the following embodiments, it will be understood that the descriptions are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it will be readily apparent to one skilled in the art that the present invention may be practiced without these specific details. In other instances, well-known methods, procedures, components and circuits have not been described in detail so as not to unnecessarily obscure aspects of the disclosure.

Some portions of the detailed descriptions which follow are presented in terms of processes, procedures, logic, functions and other symbolic representations of operations on signals, code, data bits or data streams within a computer, transceiver, processor, controller and/or memory. These descriptions and representations are generally used by those skilled in the data processing arts to effectively convey the substance of their work to others skilled in the art. A process, procedure, logic operation, function, process, etc., is herein, and is generally, considered to be a step or a self-consistent sequence of steps or instructions leading to a desired and/or expected result. The steps generally include physical manipulations of physical quantities. Usually, though not necessarily, these quantities take the form of electrical, magnetic, optical, or quantum signals capable of being stored, transferred, combined, compared, and/or otherwise manipulated in a computer, data processing system, optical component, or circuit. It has proven convenient at times, principally for reasons of common usage, to refer to these signals as bits, streams, values, elements, symbols, characters, terms, numbers, information or the like. It should be borne in mind, however, that all of these and similar terms are associated with the appropriate physical quantities and/or signals, and are merely convenient labels applied to these quantities and/or signals.

Unless specifically stated otherwise, or as will be apparent from the following discussions, it is appreciated that throughout the present application, discussions utilizing terms such as "processing," "operating," "calculating," "determining," or the like, refer to the action and processes of a computer, data processing system, or similar processing device (e.g., an electrical, optical, or quantum computing or processing device or circuit) that manipulates and transforms data represented as physical (e.g., electronic) quantities. The terms refer to actions and processes of the processing devices that manipulate or transform physical quantities within the component(s) of a circuit, system or architecture (e.g., registers, memories, other such information storage, transmission or display devices, etc.) into other data or information similarly represented as physical quantities within other components of the same or a different system or architecture.

Furthermore, in the context of this application, the terms "signal" and "optical signal" refer to any known structure, construction, arrangement, technique, method and/or process for physically transferring data or information from one point to another. Also, unless indicated otherwise from the context of its use herein, the terms "fixed," "given," "certain" and "predetermined" generally refer to a value, quantity, parameter, constraint, condition, state, process, procedure, method, practice, or combination thereof that is, in theory, variable, but is typically set in advance and not varied thereafter when in use. Similarly, for convenience and simplicity, the terms "time," "rate," "period" and "frequency" are, in general, interchangeable and may be used interchangeably herein, as are the terms "data," "bits," and "information," but these terms are generally given their art-recognized meanings.

For the sake of convenience and simplicity, the terms "optical" and "optoelectronic" are generally used interchangeably herein, and use of either of these terms also includes the other, unless the context clearly indicates otherwise, but these terms are generally given their art-recognized meanings herein. Furthermore, the term "transceiver" refers to a device having at least one receiver and at least one transmitter, and use of the term "transceiver" also includes the individual terms "receiver" and/or "transmitter," unless the context clearly indicates otherwise. Also, for convenience and simplicity, the terms "connected to," "coupled with," "communicating with," "coupled to," and grammatical variations thereof (which terms also refer to direct and/or indirect relationships between the connected, coupled and/or communicating elements unless the context of the term's use unambiguously indicates otherwise) may be used interchangeably, but these terms are also generally given their art-recognized meanings.

Various embodiments and/or examples disclosed herein may be combined with other embodiments and/or examples, as long as such a combination is not explicitly disclosed herein as being unfavorable, undesirable or disadvantageous. The invention, in its various aspects, will be explained in greater detail below with regard to exemplary embodiments.

In various embodiments, the tunable receiver includes two MEMS mirrors and one thin film filter (TFF). In particular embodiments, the tunable receiver receives a collimated optical beam with multiple wavelengths (e.g., a multi-channel optical signal). The optical beam is reflected by a first MEMS mirror, then the beam passes through the TFF, then is reflected a second time by a second MEMS mirror. The doubly-reflected optical beam is focused onto a beam detector such as a photodiode (PD) with a lens. The angle of incidence (AOI) of the beam to the TFF can be changed by tuning the first MEMS mirror. Changing the AOI of the beam relative to the TFF tunes the center wavelength of the light that passes through the TFF (i.e., the bandpass filter wavelength). The second MEMS mirror is tuned in synchronization with the first MEMS mirror so that the reflected optical beam is always focused onto the same location (e.g., the photodetector) during the tuning process.

The multi-wavelength optical beam that is received from the optical fiber is generally collimated, and may be polarized or unpolarized. Use of a collimating lens helps reduce optical scattering or spreading of the optical beam. In certain embodiments, the TFF is or comprises a 100 GHz dense wavelength division multiplexing (DWDM) band pass filter.

An Exemplary Receiver

FIG. 1 shows an optical/optoelectronic receiver 10 that includes a first MEMS mirror 20, a thin film filter 30, a second MEMS mirror 25, a lens 40 and a photodetector 50. The receiver 10 receives a multi-wavelength or multi-band optical signal 12. Each wavelength or band in the multi-wavelength or multi-band optical signal 12 represents a corresponding channel over which the receiver 10 receives optical communications (e.g., signals). In most embodiments, the photodetector 50 comprises a photodiode (e.g., an avalanche photodiode). Thus, the receiver 10 may be part of an optical wavelength-multiplexing (OWDM) system or network.

The first MEMS mirror 20 reflects the received multi-wavelength or multi-band optical signal 12. The optical signal 12 is generally collimated and may be polarized, and when polarized, the different wavelengths or bands may have the same or different polarization states (e.g., s or p). The thin film filter 30 receives the reflected multi-wavelength or multi-band optical signal 14 and filters all but one wavelength or band of the reflected optical signal 14, thereby separating a single-wavelength optical signal (i.e., light having one of the wavelengths) from light in the multi-wavelength optical signal having the remaining wavelength(s). The second MEMS mirror 25 reflects the separated single-wavelength optical signal 16 towards the lens 40, which focuses the separated single-wavelength signal 16 on the photodetector 50.

A controller (not shown) changes the reflection angle of the first MEMS mirror 20 to change the angle of incidence (AOI) of the thin film filter 30 with respect to the reflected multi-wavelength or multi-band optical signal 14. The controller generally changes the angle of the first MEMS mirror 20 with respect to the received multi-wavelength or multi-band optical signal 12 in response to an instruction (e.g., from a host or other device in the network) to receive and process light having a different wavelength (i.e., an optical signal in a different channel). The channel can be changed within a short time (e.g., from 0.001 to 1 second, or any value or range of values therein, such as 0.01 seconds). Each distinct reflection angle of the first MEMS mirror 20 with respect to the optical signal 12, in combination with the AOI of the thin film filter 30 with respect to the reflected optical signal 14, effectively selects one wavelength of the multi-wavelength or multi-band optical signal 12/14.

For example, when the optical signal 12 has four distinct wavelengths or bands (i.e., the receiver receives signals over four channels), the optical signal 12 is reflected by the first MEMS mirror 20 at four distinct angles. The first reflection angle (e.g., the initial angle) is for selecting the first wavelength, a second reflection angle is for selecting the second wavelength, a third reflection angle is for selecting a third wavelength, and a fourth reflection angle is for selecting a fourth wavelength. The first through fourth angles at which the first MEMS mirror reflects signal 12 may differ from each other by a minimum of ±0.1, ±0.5°, ±1.0°, or any other value of at least ±0.1°, and by a maximum of ±5.0°, ±2.0°, or any other value of less than ±5.0°. However, the exact angles may be determined on the basis of the number of channels in the network or wavelengths in the optical signal 12, the filtering properties of the thin film filter 30, and the spacing between adjacent channels. In addition, the filtering properties of the thin film filter 30 that influence the reflection angles of the first MEMS mirror 20 include the nature of the thin film filter 30 (e.g., bandpass vs. notch) and the wavelengths of tight reflected by the thin film filter 30 and/or to which the thin film filter 30 is transparent or substantially transparent (e.g., has a transmittance of at least 90% or any minimum value>90%).

The AOI of the reflected multi-wavelength optical signal 14 to the TFF 30 can be changed by tuning the MEMS mirror 20. The first MEMS mirror 20 is tuned by changing its angle relative to the received multi-wavelength optical signal 12. The AOI of the reflected optical signal 14 to the TFF 30 tunes the center wavelength of the passing or reflecting band of the TFF (i.e., the center wavelength of tight that passes through or is reflected by the TFF 30, respectively). The second MEMS mirror 25 may be (and generally is) tuned in synchronization with the first MEMS mirror 20, so that the single-wavelength optical signal 18 is focused by the lens 40 onto one location (e.g., the photodetector 50) during the tuning process.

Figure 2:
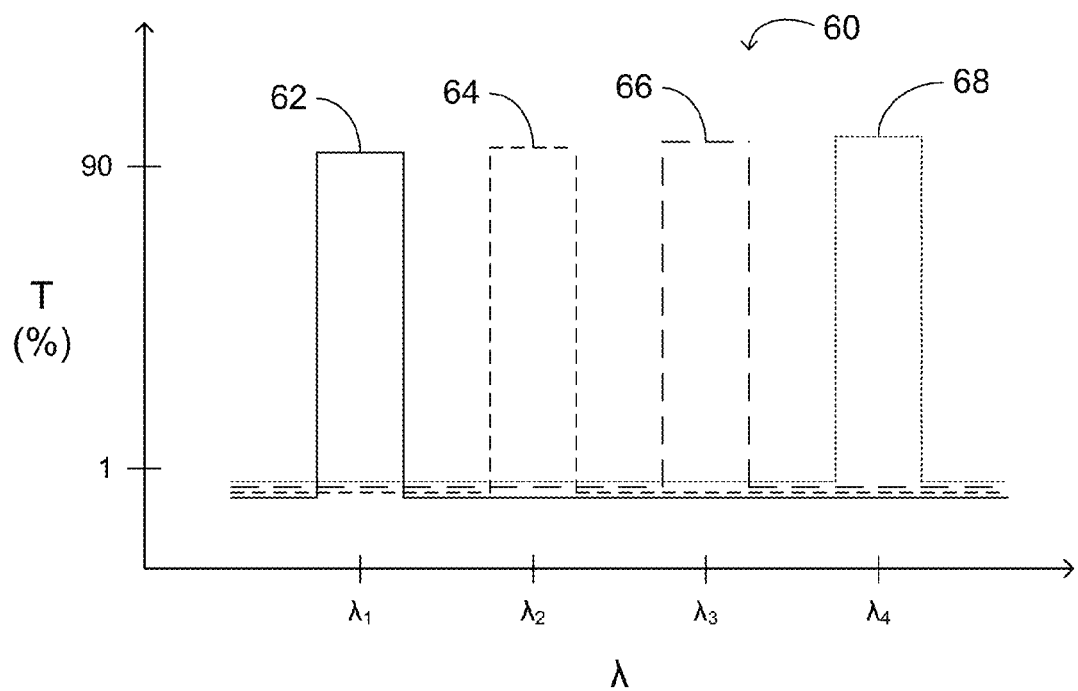
FIG. 2 is a diagram showing exemplary graphs of the optical transmittance properties of a thin film filter in accordance with one or more embodiments of the present invention as a function of the angle of incidence of a reflected multi-wavelength optical signal.

The tuning and/or channel/wavelength selection process can be explained with regard to the graph 60 shown in FIG. 2. The lines 62, 64, 66 and 68 in the graph of FIG. 2 depict the filtering properties of the TFF 30 (i.e., the transmittance T) as a function of the wavelength of light λ (e.g., for each of the wavelengths in the multi-wavelength or multi-wavelength band optical signal) at different AOIs. For example, the multi-band optical signal may have four wavelengths with respective center wavelengths $\lambda_1$, $\lambda_2$, $\lambda_3$ and $\lambda_4$. The transmittance T of a bandpass thin film filter at each of the center wavelengths $\lambda_1$, $\lambda_2$, $\lambda_3$ and $\lambda_4$ may be >90%, and at wavelengths or wavelength bands above, below and between the wavelengths may be <1%. Alternatively, a notched thin film filter may have a reflectance at each of the center wavelengths of >90% and a transmittance and/or absorbance at wavelengths or wavelength bands between the wavelengths of >90%. In either case, the thin film filter generally has a transmittance when the TFF is a bandpass TEE) or reflectance (i.e., when the TFF is a notched TFF) at a given wavelength that is dependent on the AOI.

For example, the line 62 represents the transmittance through a bandpass TFF when the bandpass TFF has a first AOI with respect to the multi-wavelength or -wavelength band optical signal reflected by the first MEMS mirror (and, concomitantly, the first MEMS mirror has a first angle with respect to the received multi-wavelength or -wavelength band optical signal). At the center wavelength $\lambda_1$, the transmittance of the TFF is relatively high (e.g., >90%), but at wavelengths outside the band of the first channel, the transmittance of the TFF is relatively low (e.g., <1%). As a result, the TFF selectively transmits light having the center wavelength $\lambda_1$ (i.e., the portion of the optical signal in the first channel) when the bandpass TFF has the first (or initial) AOI (with respect to the optical signal reflected by the first MEMS mirror) and the first MEMS mirror has the first reflection angle (with respect to the received optical signal, respectively).

Similarly, the lines 64, 66 and 68 represent the transmittance through the bandpass TFF when the bandpass TFF has second, third and fourth AOIs with respect to the optical signal reflected by the first MEMS mirror, respectively. Concomitantly, the first MEMS mirror has second, third and fourth reflection angles with respect to the received multi-wavelength optical signal when the bandpass TFF has its second, third and fourth AOIs with respect to the reflected multi-wavelength optical signal, respectively. At the center wavelengths $\lambda_2$, $\lambda_3$ and $\lambda_4$, the transmittance of the TFF is relatively high (e.g., >90%), but at wavelengths outside the second, third and fourth channels, the transmittance of the TEE is relatively low (e.g., <1%). As a result, the TFF selectively transmits light having the center wavelengths $\lambda_2$, $\lambda_3$ and $\lambda_4$ (i.e., the portion of the optical signal having the second, third and fourth wavelengths) when the bandpass TFF has the second, third and fourth AOIs and the first MEMS mirror has the second, third and fourth reflection angles.

In present optical networks, the center wavelength (e.g., $\lambda_{max}$) of light in adjacent channels may be separated by 0.4-2.0 nm or more. Thus, the frequencies in the multi-wavelength optical signal may be separated by at least 50 GHz, 100 GHz, 200 GHz or any other value >50 GHz. However, the AOIs of the thin film filter 30 with respect to the reflected multi-wavelength optical signal 14 are difficult to specify in a general sense, as they depend on a wide variety of different factors, including the reflection angles of the first MEMS mirror 20, the initial AOI of the TFF 30 (e.g., the reference point), and the technique(s) by which the TFF 30 is manufactured and/or mounted. In one example, the initial angle of the TFF to the signal 14 is 12°, and the thin film filter 30 has a bandpass that changes by about −2 nm for every +1° change in the AOI of the reflected optical signal. For example, if the thin film filter 30 is substantially transparent to light having a wavelength of 1546 nm at an AOI of 12°, then the thin film filter 30 may be substantially transparent to light having a wavelength of 1544 nm at an AOI of 13°.

Additionally or alternatively, the precision or accuracy of the AOI of the MEMS mirrors 20 and 25 with respect to the multi-wavelength optical signal 12 and the single-wavelength optical signal 16, respectively, should be high when the wavelength separation between adjacent channels in the multi-wavelength optical signal 12 is relatively small (e.g., ≤1 nm). Thus, in various embodiments, the positional precision of the angle of the MEMS mirrors 20 and 25 may be known within 0.1' or less (for example, within 0.03°).

Referring back to FIG. 1, in some embodiments, the MEMS mirrors 20 and 25 may tilt along an axis (i.e., in one dimension) or with respect to a pivot point (e.g., in either or both of two orthogonal dimensions, and optionally, angularly about the pivot point). For example, the MEMS mirrors 20 and 25 may comprise so-called digital microdevice (DMD) mirrors. Such mirrors are disclosed in, e.g., U.S. Pat. Nos. 5,233,456, 5,392,151, 5,517,347 and 5,696,619, the relevant portion(s) of which are incorporated herein by reference.

The reflective surface of the MEMS mirrors 20 and 25 may have length and width (e.g., surface area) dimensions of from 0.1×0.1 mm to 5×5 mm. The length and width dimensions may independently have any value or range of values within the range of 0.1-5 mm (e.g., from 0.5×0.6 mm to 2×2.5 mm).

The angle of the TFF 30 in the housing of the optical or optoelectronic receiver (not shown in FIG. 1) is generally fixed at the initial AOI (as a reference point). In general, the angle of the TFF 30 can be defined with respect to one of the wavelengths of the optical signal 14 reflected from the first MEMS mirror 20 (e.g., the portion of the optical signal having the first wavelength). The angle of the TFF 30 with respect to the selected wavelength of the reflected multi-wavelength optical signal 14 generally matches the angle-dependent filtering characteristics of the TFF 30 with the separation or spacing between the channels over which the receiver 10 receives the multi-wavelength optical signal 12.

In the embodiment shown in FIG. 1, the second MEMS mirror 25 reflects the single-wavelength optical signal 18 in a direction towards the optical fiber connector (not shown). Thus, a housing (not shown) for the receiver 10 may have dimensions enabling placement of the photodetector 50 on a circuit board adjacent or proximate to the optical fiber connector. As a result, the light path from the first MEMS mirror 20 to the second MEMS mirror 25 is generally longer (e.g., by 2× or more) than the light path from the second MEMS mirror 25 to the photodetector 50.

During use and/or over time, a component (e.g., light having a single wavelength) of the multi-wavelength optical signal within a given channel may drift or may not be centered (e.g., on the $\lambda_{max}$ of the channel). Thus, during set up and/or operation, a feedback path from the photodetector 50 to a controller (not shown) for the receiver 10 may use dithering to tune the single-wavelength signal(s) to the $\lambda_{max}$ of one or more given channels.

The receiver 10 may include additional components in the optical path, such as an additional lens and/or an additional bandpass and/or polarization filter. The additional lens may be, for example, in the optical path between the first MEMS mirror 20 and the thin film filter 30, or between the thin film filter 30 and the second MEMS mirror 25. Furthermore, when the housing of the receiver 10 has a more highly folded optical cavity, the receiver may include a simple mirror (e.g., in the optical path between the second MEMS mirror 25 and the photodetector 50).

An Exemplary Transceiver and Optical Module

Figure 3:
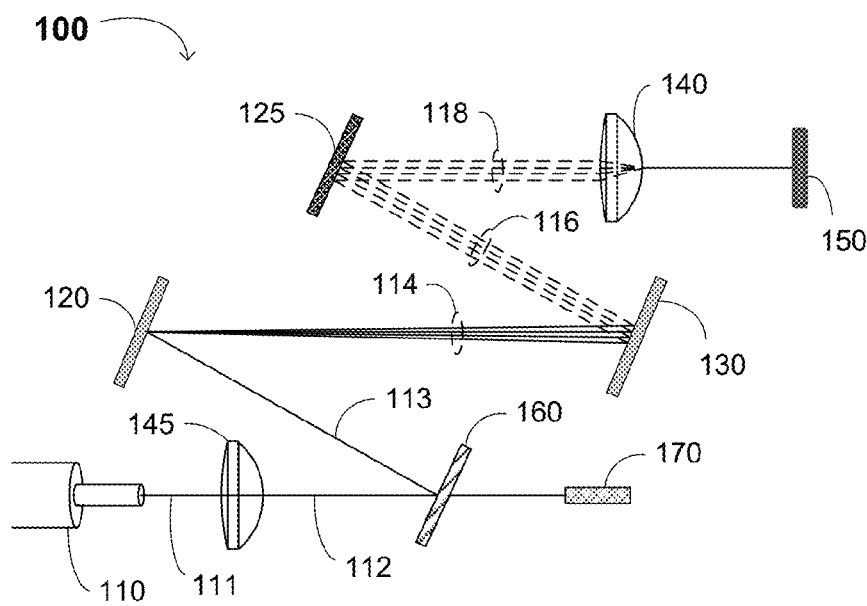
FIG. 3 is a showing an exemplary transceiver in accordance with one or more embodiments of the present invention.

FIG. 3 shows an exemplary optical transceiver 100 according to embodiments of the present invention, including a notched thin film filter 130, a beam splitter 160 and an optical transmitter 170. In one embodiment, the optical transmitter 170 comprises a laser diode (e.g., an avalanche laser diode).

The transceiver 100 of FIG. 3 includes an optical fiber connector (not shown) for an optical fiber 110, a collimating lens 145, the beam splitter 160, the optical transmitter 170, a first MEMS mirror 120, the notched thin film filter 130, a second MEMS mirror 125, a focusing lens 140 and a photodetector 150. The first MEMS mirror 120, the second MEMS mirror 125, the focusing lens 140 and the photodetector 150 are substantially the same as or similar or identical to the first MEMS mirror 20, the second MEMS mirror 25, the lens 40 and the photodetector 50 in FIG. 1. Accordingly, the descriptions of the first MEMS mirror 20, the second MEMS mirror 25, the lens 40 and the photodetector 50 with regard to FIG. 1 also applies to the first MEMS mirror 120, the second MEMS mirror 125, the lens 140 and the photodetector 150 in FIG. 3.

The optical fiber 110 provides a multi-wavelength or multi-band optical signal 111, which is collimated by the lens 145 to form a collimated multi-wavelength optical signal 112. The collimated multi-wavelength optical signal 112 is reflected by the beam splitter 160 towards the first MEMS mirror 120, which reflects the multi-wavelength optical signal 113 at one of a plurality of different angles towards the notched thin film filter 130, depending on the wavelength, band or channel of the multi-wavelength optical signal 113 to be selected by the notched thin film filter 130. Thus, the multi-wavelength optical signal 114 is reflected by the first MEMS mirror 120 at one of a plurality of different angles, as described above with regard to FIG. 1.

The notched thin film filter 130 selectively reflects the wavelength, band or channel of the multi-wavelength optical signal 114 having the (center) wavelength that matches the angle-dependent reflectivity characteristics of the notched thin film filter 130. For example, the notched thin film filter 130 may comprise a dense wavelength division-multiplexing (DWDM) filter (e.g., suitable for use in a 100 GHz [100 G] optical network). The reflected wavelength, band or channel 116 is reflected again by the second MEMS mirror 125 towards the lens 140 in a substantially similar or identical manner as the second MEMS mirror 25 in FIG. 1, and the lens 140 focuses the component of the optical signal having the selected wavelength, band or channel onto the photodetector 150. The multi-wavelength optical signals 113 and 114 and the single-wavelength, -band or -channel signals 116 and 118 are substantially the same as, or similar or identical to, the optical signals 12, 14, 16 and 18 in FIG. 1.

The transceiver 100 has an optical cavity that is folded in a manner enabling the optical transmitter 170 and the photodetector 150 to send or receive optical signals using the same optical fiber 110, and be on the same side of the housing (not shown; e.g., on a side away from or opposite that of the optical fiber 110). The present transceiver 100 is compatible with existing packaging types, such as XFP-compliant packaging, XMD-compliant (e.g., so-called "gold box") packaging and transistor outline (TO) packaging, for example. It is within the abilities of those skilled in the art to design a housing with an optical cavity that accommodates the components of the transceiver 100 in the locations and/or relationships shown, that also fits within such existing packaging types.

The present transceiver advantageously has a small size, fast tuning speed, and low cost of manufacturing (e.g., for mass production). The present transceiver may be, function as or be suitable for use as a next generation passive optical network (e.g., NGPON2) optical network unit (ONU) or optical line terminal (OLT). However, like the receiver 10 (FIG. 1), the transceiver 100 of FIG. 3 may be part of any multi-channel or multiple wavelength optical wavelength-multiplexing (OWDM) system or network.

Also, like the receiver 10 of FIG. 1, the MEMS mirrors 120 and 125 in the transceiver 100 of FIG. 3 are synchronized to move at the same time when the angle of the first MEMS mirror 120 is changed (i.e., to select a different wavelength, band or channel of the optical signal 113), but in an opposite direction. For example, if the angle of the first MEMS mirror 120 is increased (e.g., by 1°), then the angle of the second MEMS mirror 125 is decreased by the same amount.

Figure 4:
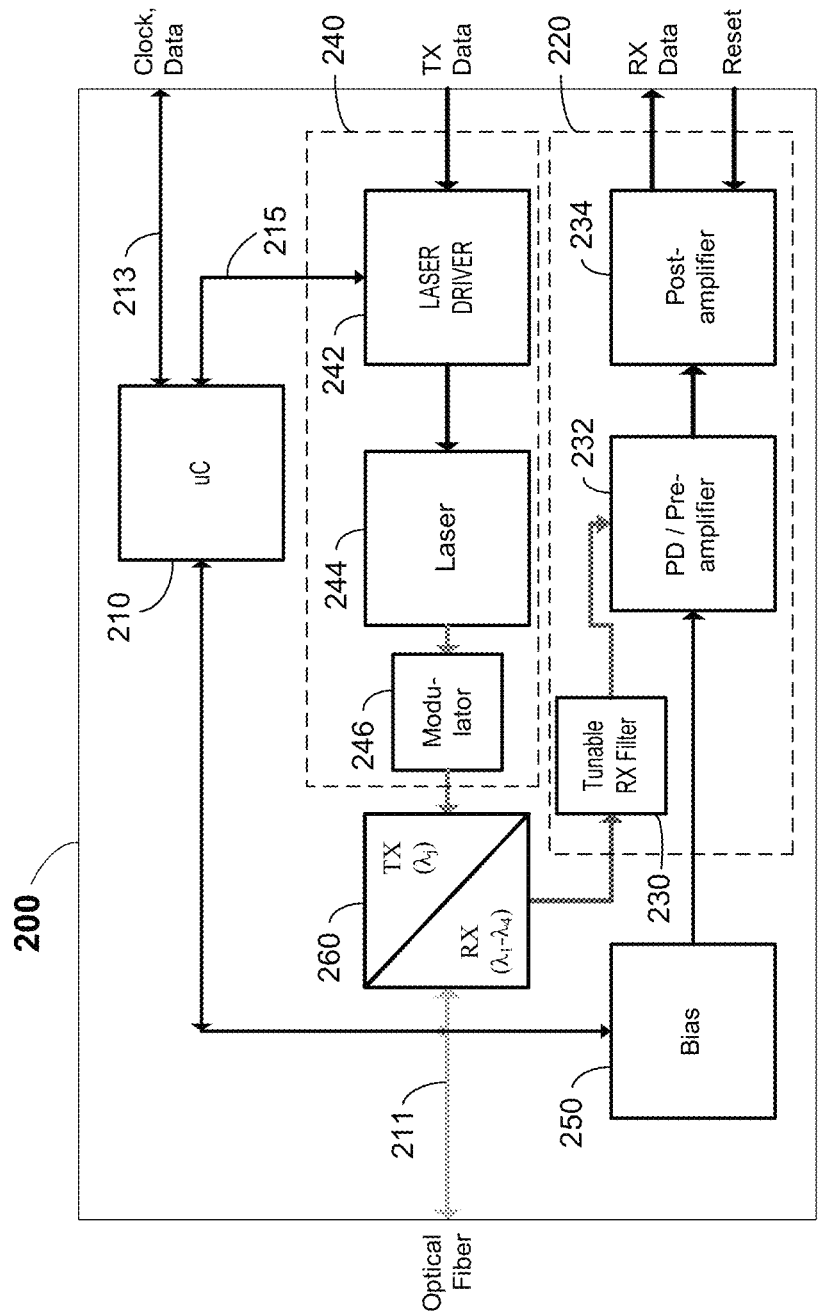
FIG. 4 is a diagram showing an exemplary components in an optoelectronic transceiver module in accordance with one or more embodiments of the present invention.

FIG. 4 shows an exemplary block diagram exemplary of an optical transceiver module 200 according to embodiments of the present invention. The optical transceiver module 200 includes a microcontroller or other (micro) processor 210, a receiver optical subassembly (ROSA) 220, and a transmitter optical subassembly (TOSA) 240. The microcontroller 210 controls (directly or indirectly) the various components and/or processes in the ROSA 220 and TOSA 240. The optical transceiver module 200 also includes a photodetector bias circuit 250 and a beam splitter 260. In some embodiments, the photodetector bias circuit 250 may be included in the ROSA 220.

When the optical transceiver module 200 receives a multi-wavelength optical signal from the optical fiber in the fiber connector 211, the beam splitter 260 splits or separates light having wavelengths in a first range or band (e.g., including wavelengths $\lambda_1$-$\lambda_4$ discussed above with regard to FIGS. 1-3) for processing by the ROSA 220. In one example, the beam splitter 260 reflects such light to the ROSA 220, in which case the TOSA 240 transmits an optical signal having a wavelength $\lambda_j$ through the beam splitter 260 to the optical fiber ($\lambda_j$ is outside the first range or band reflected by the beam splitter 260). Alternatively, the beam splitter 260 transmits light having wavelengths in the first range or band to the ROSA 220, in which case the beam splitter 260 reflects light having a wavelength outside the first range or band from the TOSA 240 to the optical fiber. In various embodiments, the optical fiber connector 211 comprises an SC (e.g., square connector or standard connector) and/or an ultra physical contact (UPC) connector, although in some embodiments, an angled physical contact (APC), EC or LC connector may also be employed.

The ROSA 220 comprises a tunable RX filter 230, a photodetector (and optional pre-amplifier) 232, and a post-amplifier 234. The tunable RX filter 230 can be or comprise components of the tunable receiver shown in FIGS. 1 and 3, including the first MEMS mirror 20/120, the thin film filter 30/130, the second MEMS mirror 25/125, and one or both of the focusing lens 40/140 and the collimating lens 145. The wavelength, band or channel of the received multi-wavelength optical signal is received by the photodetector 232, which converts the optical signal to an electrical signal. In one example, the photodetector 232 comprises an avalanche photodiode.

To generate the electrical signal, the photodetector/pre-amplifier block 232 receives a bias current or bias voltage from the bias circuit 250. The bias circuit 250 receives one or more control signals (e.g., a bias control signal) from the microcontroller 210 on bidirectional bus 213, and the bias circuit 250 may provide one or more signals (e.g., a feedback signal) to the microcontroller 210 on the bus 213. The electrical signal is optionally amplified by a pre-amplifier in direct electrical communication with the electrical output from the photodetector 232, and the optionally pre-amplified electrical signal may be (further) amplified and transmitted as an electrical data signal or stream ("RX Data") by the post-amplifier 234 to a device (such as a host device) in the optical network. In one embodiment, the pre-amplifier comprises a transimpedance amplifier, and in another embodiment, the post-amplifier 234 comprises a limiting amplifier. Alternatively, when the pre-amplifier is not present, the post-amplifier 234 may comprise a transimpedance amplifier. The post-amplifier 234 may receive a reset signal from a device in the network (e.g., the host device).

The network device or host may also transmit an electrical data signal TX Data to the TOSA 240 in the optical transceiver module 200. The electrical data signal is received by a laser driver 242, which transmits a laser driving signal to the laser 244. The laser driver 242 receives one or more control signals (e.g., an automatic power control signal, a temperature control signal, etc.) from the microcontroller 210 on bidirectional bus 215, and may provide one or more signals a feedback signal) to the microcontroller 210 on the bus 215. The laser 244 converts the laser driving signal to a single-wavelength optical data signal. In one embodiment, the laser 244 comprises a tunable laser, which can change the wavelength of the optical signal to that of a different transmission channel of the optical network (e.g., over which data is transmitted in the optical network). The laser 244 produces an output optical signal having a different wavelength that those in the received multi-wavelength optical signal, and is conventional. The output optical signal may be modulated by an optional modulator 246. In one embodiment, the modulator 246 receives one or more control signals (not shown) from the microcontroller 210. As explained above, the beam splitter 260 in FIG. 4 allows the output optical signal from the laser 244 or modulator 246 to pass through to the optical fiber.

An Exemplary Method of Using a Tunable Optical Receiver

One aspect of the present invention involves a method of receiving and processing a multi-wavelength optical signal, comprising reflecting the multi-wavelength optical signal using a first microelectromechanical device towards a thin film filter, separating one wavelength of the multi-wavelength optical signal from the remaining wavelength(s) using the thin film filter, reflecting the separated single-wavelength optical signal towards a lens using a second microelectromechanical device, and focusing the separated single-wavelength optical signal on a photodetector using the lens. Each wavelength of the multi-wavelength optical signal represents a unique channel over which the receiver (or a transceiver including the receiver) communicates.

FIG. 5 shows a flowchart 300 of an exemplary method of receiving and processing a multi-wavelength optical signal. In various embodiments, the multi-wavelength optical signal is processed using an optical wavelength division multiplexing system and method (e.g., a dense wavelength division multiplexing [DWDM] system and method). The method starts at 310 by receiving the multi-wavelength optical signal (e.g., in the exemplary receiver 10 of FIG. 1 or 100 of FIG. 3, or in the exemplary transceiver 200 of FIG. 4). In general, the multi-wavelength optical signal contains a collimated optical signal. Each wavelength of the multi-wavelength optical signal is ideally at or very close to the center wavelength (or $\lambda_{max}$) of a different channel over which the network communicates optical information. In one embodiment, the multi-wavelength optical signal has at least four (4) wavelengths.

As discussed herein, the multi-wavelength optical signal is reflected at one of a plurality of different angles at 320, depending on the channel or wavelength of the multi-wavelength optical signal to be selected. The multi-wavelength optical signal is reflected by a first MEMS mirror, as described herein. The first MEMS mirror reflects the multi-wavelength optical signal at one of the angles, depending on which channel or wavelength is to be processed by the receiver.

Subsequently, one wavelength of the multi-wavelength optical is selected for reception and/or processing at 330 using a thin film filter having an angle-dependent transmissivity or reflectivity band. In particular, at one angle of incidence (e.g., an initial AOI), the thin film filter selects a first wavelength and filters the remaining wavelengths, and at other angles of incidence, the thin film filter selects another wavelength and filters the remaining wavelengths (including the first wavelength). In some embodiments, the one wavelength (i.e., the single-wavelength optical signal) is selected by passing the one wavelength through the thin film filter, and reflecting or absorbing the remaining wavelengths (e.g., the thin film filter is a bandpass filter). Alternatively, the one wavelength is selected by reflecting the one wavelength using the thin film filter, and absorbing or passing the remaining wavelengths through (e.g., the thin film filter is a notched filter).

At 340, the single-wavelength optical signal (i.e., having the selected wavelength) is reflected by a second MEMS mirror at an angle corresponding to the AOI in 320 towards a photodetector. In some embodiments, the reflection angle of the second. MEMS mirror in 340 is complementary to the reflection angle of the first MEMS mirror in 320. For example, if the reflection angle of the first MEMS mirror in 320 is x° when selecting a first wavelength and $(x+\delta)°$ when selecting a second wavelength, then the reflection angle of the second MEMS mirror in 340 is y° when selecting a first wavelength and $(y-\delta)°$ when selecting a second wavelength. In other words, if the reflection angles of the first and second MEMS mirrors are $x_i$ and $y_i$, respectively (where i is the selected wavelength), then $x_i+y_i=c$ (where c is a constant).

At 350, the single-wavelength optical signal is received at a photodetector (e.g., a photodiode), where it is converted to an electrical signal at 360 and subsequently processed (e.g., amplified by an amplifier in the optical transceiver including the first and second MEMS mirrors and the thin film filter, filtered [e.g., with an electrical bandpass filter], and/or transmitted to a host device in electrical communication with the optical transceiver]).

At 345, the method determines whether an instruction to change the channel or wavelength to be selected has been received. In other words, in an OWDM system, channel or wavelength selection may change. During the time period in which the optical signal having the selected wavelength is received (e.g., by the photodetector at 350), the method continues at 320, 330, 340 and 350 (and typically, also at 360). However, when the channel or wavelength of the optical signal to be selected changes, the multi-wavelength optical signal is reflected by the first MEMS mirror at a different angle corresponding to a different (e.g., second) channel or wavelength at 370, and the different wavelength of the multi-wavelength optical signal is selected using the thin film filter at 380. The single-wavelength optical signal having the newly selected wavelength is reflected by a second MEMS mirror at 340 at an angle corresponding to the new angle in 370 towards the photodetector, which receives the single-wavelength signal having the newly selected wavelength at 350. A different wavelength (e.g., a third wavelength or the first wavelength) can be selected when a corresponding instruction to change the wavelength or channel is received (e.g., at 345). The method ends when the multi-wavelength optical signal is no longer received.

An Exemplary Method of Making a Tunable Optical Receiver

Yet another aspect of the present invention involves a method of making a multi-wavelength optical or optoelectronic receiver, comprising placing first and second microelectromechanical devices, a thin film filter, a first lens and a photodetector in a package or housing, testing the multi-wavelength optical or optoelectronic receiver to ensure operability and/or maximize a received signal strength of a separated single-wavelength optical signal, and securing the first and second microelectromechanical devices, thin film filter, first lens and photodetector. Each wavelength of the multi-wavelength optical signal represents a unique channel over which the receiver receives optical information. The first and second microelectromechanical devices, the thin film filter, the lens and the photodetector are placed in the package or housing such that the first microelectromechanical device receives and reflects a multi-wavelength optical signal towards the thin film filter, the thin film filter separates one wavelength of the multi-wavelength optical signal from the remaining wavelengths, the second microelectromechanical device reflects the separated single-wavelength optical signal towards the first lens, and the lens focuses the separated single-wavelength optical signal on the photodetector.

Generally, the thin film filter is placed in the optical path between the first and second microelectromechanical devices (which may be MEMS mirrors). The lens (e.g., a focusing lens) is generally placed in the optical path between the second microelectromechanical device and the photodetector. In various embodiments, the first and second microelectromechanical devices, the thin film filter, the lens and the photodetector are secured to a mounting surface in or on the package or housing, or in or on a wall of an optical cavity inside the package or housing.

In certain embodiments, the method may further include forming the receiver optical cavity. The receiver optical cavity is generally a space having predetermined dimensions inside a receiver body or housing, with surfaces having predefined areas, contours, and/or orientations relative to other surfaces. When the receiver body or housing comprises or is formed from a plastic, the receiver optical cavity may be formed by molding (e.g., injection molding). Additionally or alternatively, when the receiver body or housing comprises or is formed from a metal (e.g., a metal sheet or plate), forming the receiver body or housing (and optionally forming or at least defining the receiver optical cavity) may comprise stamping the metal into a component or form of the receiver body or housing (and optionally the receiver optical cavity).

In the present method of making, the first and second microelectromechanical devices, the thin film filter, the lens and the photodetector may be placed in predetermined positions and/or locations in the package or housing (or in the optical cavity thereof), and after testing, when the received signal strength of the separated single-wavelength optical signal is below a predetermined threshold (or is not at a maximum value), the positions and/or locations of one or more of the first and second microelectromechanical devices, the thin film filter, the lens and the photodetector may be adjusted. The first and second microelectromechanical devices, the thin film filter, the lens and the photodetector are secured when the received signal strength of the separated wavelength is equal to or above the predetermined threshold or is at the maximum value.

In some embodiments, the method may further comprise placing a second lens (e.g., a collimating lens), a beam splitter, a (simple) mirror and/or an optical transmitter in the package or housing (or in the optical cavity thereof). The second lens may be placed in a position or location proximate to an optical fiber connector (e.g., in the optical path between the optical fiber connector and the first MEMS mirror or the beam splitter). The beam splitter may be placed in a position or location in the optical path between (1) the optical fiber connector and/or the second lens and (2) the optical transmitter. The (simple) mirror may be placed in a position or location receiving the reflected single-wavelength optical signal from the second MEMS mirror, and have dimensions adapted for further reflecting the reflected single-wavelength optical signal towards the first lens, regardless of the reflection angle of the second MEMS mirror. The optical transmitter may comprise a laser diode (e.g., a tunable distributed feedback [DFB] laser diode)

In many embodiments, the method further comprises forming the optical fiber connector at a first end of the receiver package or housing (or the receiver optical cavity). In some cases, the photodetector is placed in a location between the optical fiber connector and the second MEMS mirror (e.g., such that the distance between the photodetector and the optical fiber connector is significantly less than the distance between the second MEMS mirror and the optical fiber connector). In such cases, the distance between the first and second MEMS mirrors may be greater than the distance between the optical fiber connector and the second MEMS mirror. Alternatively, the optical fiber connector, the first MEMS mirror and the (simple) mirror may be at or along a first side or end of the receiver optical cavity, and the laser diode, second MEMS mirror and photodetector may be at or along a second (e.g., opposite) side or end of the receiver optical cavity.

CONCLUSION/SUMMARY

Embodiments of the present invention advantageously provide a tunable optical or optoelectronic receiver, transceiver and methods for use in next generation passive optical network ONUS or OLTs having a small size, fast tuning speed, low cost, and mature component technology, enabling mass production. The receiver includes two MEMS devices and a thin film filter in the optical path between the MEMS devices. The thin film filter may have filtering characteristics that change as a function of the angle of incidence (AOI) of the multi-wavelength optical signal to the thin film filter. This AOI can be changed by tuning (e.g., changing the reflection angle of) the first MEMS mirror. Changing the AOI of the beam relative to the thin film filter tunes the center wavelength of the multi-wavelength optical signal that impinges on the thin film filter, enabling selection of a single-wavelength optical signal (i.e., having one of the wavelengths of the multi-wavelength optical signal). The second MEMS mirror is tuned in synchronization with the first MEMS mirror so that the reflected single-wavelength optical beam is focused onto the photodetector, regardless of the reflection angle of the first MEMS mirror.

The foregoing descriptions of specific embodiments of the present invention have been presented for purposes of illustration and description. They are not intended to be exhaustive or to limit the invention to the precise forms disclosed, and obviously many modifications and variations are possible in light of the above teachings. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. An optical or optoelectronic receiver, comprising:
  a photodetector;
  a first microelectromechanical device configured to reflect a multi-wavelength optical signal;
  a thin film filter configured to (i) receive the multi-wavelength optical signal reflected by the first microelectromechanical device and (ii) separate a single-wavelength optical signal from the received multi-wavelength optical signal;
  a first lens configured to focus the single-wavelength optical signal on the photodetector; and
  a second microelectromechanical device configured to reflect the single-wavelength optical signal towards the first lens.

2. The receiver of claim 1, wherein said first microelectromechanical device has a unique reflection angle with respect to the multi-wavelength optical signal for each wavelength of the multi-wavelength optical signal.

3. The receiver of claim 2, wherein said second microelectromechanical device has a reflection angle with respect to the single-wavelength optical signal that is synchronized with the reflection angle of said first microelectromechanical device.

4. The receiver of claim 3, wherein said thin film filter effectively selects the wavelength of the single-wavelength optical signal in accordance with the reflection angle of the first microelectromechanical device.

5. The receiver of claim 1, wherein the multi-wavelength optical signal comprises four wavelengths.

6. The receiver of claim 5, wherein each of said wavelengths differs from the remaining wavelength(s) by at least 0.4 nm.

7. The receiver of claim 2, further comprising a controller configured to change the reflection angle of said first microelectromechanical device.

8. The receiver of claim 7, wherein each of said reflection angles of said first microelectromechanical device differs from the remaining reflection angle(s) by at least 0.1°.

9. The receiver of claim 1, wherein said thin film filter is at an angle of from 8° to 30° relative to the multi-wavelength optical signal reflected by the first microelectromechanical device.

10. The receiver of claim 1, wherein said thin film filter is a bandpass filter.

11. The receiver of claim 1, wherein said thin film filter is a notched filter.

12. The receiver of claim 1, further comprising a second lens configured to collimate the multi-wavelength optical signal.

13. An optical module, comprising:
  the receiver of claim 1;
  an optical or optoelectronic transmitter;
  a fiber adapter or connector configured to receive an optical fiber, the optical fiber carrying the optical signal to the optical module and receiving a transmission signal from the transmitter; and
  a package or housing including the receiver and the transmitter.

14. The optical module of claim 13, further comprising a beam splitter and a second lens, each inside the package or housing, the beam splitter being (i) reflective to one of the multi-wavelength optical signal and the transmission signal and (ii) transparent to the other of the multi-wavelength optical signal and the transmission signal, and the second lens collimating the optical signal and the transmission signal.

15. A method of receiving and processing a multi-wavelength optical signal, comprising:
  reflecting the multi-wavelength optical signal using a first microelectromechanical device towards a thin film filter;
  separating a single-wavelength optical signal from the multi-wavelength optical signal using the thin film filter;

reflecting the single-wavelength optical signal towards a lens using a second microelectromechanical device; and focusing the single-wavelength optical signal on a photodetector using the lens.

16. The method of claim 15, wherein said first microelectromechanical device has a unique reflection angle with respect to the multi-wavelength optical signal for each wavelength of the multi-wavelength optical signal.

17. The method of claim 16, wherein said second microelectromechanical device has a reflection angle with respect to the single-wavelength optical signal that is synchronized with the reflection angle of said first microelectromechanical device.

18. The method of claim 16, further comprising changing the reflection angle of said first microelectromechanical device with respect to the multi-wavelength optical signal to select a different single-wavelength optical signal from the multi-wavelength optical signal.

19. A method of making a multi-wavelength optical or optoelectronic receiver, comprising:

placing first and second microelectromechanical devices, a thin film filter, a first lens and a photodetector in a package or housing such that the first microelectromechanical device receives and reflects a multi-wavelength optical signal towards the thin film filter, the thin film filter separates a single-wavelength optical signal from the multi-wavelength optical signal, the second microelectromechanical device reflects the single-wavelength optical signal towards the first lens, and the first lens focuses the single-wavelength optical signal on the photodetector;

testing the multi-wavelength optical or optoelectronic receiver to ensure operability and/or maximize a received signal strength of the single-wavelength optical signal; and securing the first and second microelectromechanical devices, thin film fitter, first lens and photodetector.

20. The method of claim 19, wherein the first and second microelectromechanical devices, the thin film filter, the first lens and the photodetector are placed in predetermined positions and/or locations in the package or housing, the method further comprises adjusting positions and/or locations of one or more of the first and second microelectromechanical devices, the thin film filter, the first lens and the photodetector after testing when the received signal strength of the single-wavelength optical signal is below a predetermined threshold or is not at a maximum value, and the first and second microelectromechanical devices, the thin film filter, the first lens and the photodetector are secured when the received signal strength of the single-wavelength optical signal is equal to or above the predetermined threshold or is at the maximum value.

* * * * *